Oct. 11, 1966 A. M. ARCHER 3,278,924

DETECTION OF INTRUDERS

Filed July 1, 1964 2 Sheets-Sheet 1

INVENTOR
ANDREW M. ARCHER
BY Ernest A. Jensen
ATTORNEY

Oct. 11, 1966 A. M. ARCHER 3,278,924

DETECTION OF INTRUDERS

Filed July 1, 1964 2 Sheets-Sheet 2

INVENTOR
ANDREW M. ARCHER
BY
Ernest P. Johnson
ATTORNEY

United States Patent Office 3,278,924

Patented Oct. 11, 1966

3,278,924

DETECTION OF INTRUDERS

Andrew M. Archer, New York, N.Y., assignor to Specialties Development Corporation, Belleville, N.J., a corporation of New Jersey Filed July 1, 1964, Ser. No. 379,686

5 Claims. (Cl. 340—258)

The present invention relates to photoelectric intruder detecting systems, and, more particularly, to such a system which is an improvement over the system disclosed in my copending United States patent application Serial No. 379,104, filed June 30, 1964, for system for detecting intruders.

The aforementioned system generally comprises an electrical element such as a photocell which is responsive to light to change electrical values thereof and has a surface exposed to ambient light, a partition dividing the surface into two isolated portions, first and second lamps or radiation generating devices at the respective sides of the partition for exposing the surface portions to light from the lamps or devices, a source of A.C., reactance means connected in series with the element across the A.C. source, a first diode connected in series with the first lamp or device, across the A.C. source and arranged to conduct in one direction of current flow, a second diode connected in series with the second lamp or device across the A.C. source and arranged to conduct in the opposite direction of current flow whereby the lamps or devices are alternately illuminated to alternately expose the surface portions to an equal higher and lower radiation intensity, the reactance means having an output upon being charged unequally at opposite sides in sequence, and an alarm control network responsive to the output of the reactance means.

When the optical system for the photoelectric element is adjusted so as to restrict the field of view to permit the element to see only a selected uniform surface area on which the focal axis is directed, both surface portions of the cell are equally illuminated by ambient light and react at the same point on a response curve and their response rates are equal to each other. However, in such a system, no provision is made for the element to react at a fixed point on a non-linear portion of the response curve when there are substantial changes in the intensity of ambient light which the element sees.

Accordingly, an object of the present invention is to provide a photoelectric intruder system which is unaffected by substantial changes in ambient light within the area to be monitored by the element.

Another object is to provide such a system wherein the ambient light to which the element is exposed is automatically maintained at a substantially constant level so that the system has a relatively constant level of response in the absence of an intruder.

A further object is to provide such a system which is simple, practical and economical.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention the foregoing objects are generally accomplished by providing a system of the type described herein which includes a lamp or other radiation generating device for constantly directing ambient radiation of a substantially uniform intensity on both surface portions of the element so that the element is unaffected by changes in ambient radiations in the absence of such a compensating lamp or device.

A preferred embodiment of the invention has been chosen for purposes of illustration and description, and is shown in the accompanying drawings, forming a part of the specification, wherein.

Figure 1:
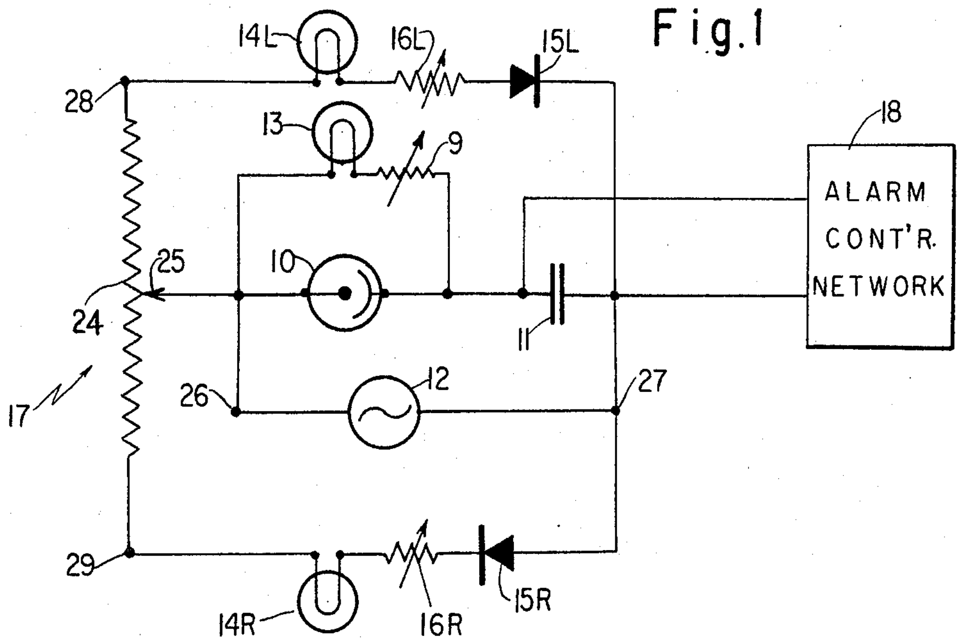
FIG. 1 is a circuit diagram of a network in accordance with the present invention.

Referring now to FIG. 1 of the drawing in detail, there is shown an intruder detecting system in accordance with the present invention which comprises a photocell 10, a capacitor 11, a 115-volt source of A.C. 12, a lamp 13, a pair of lamps 14L and 14R, a pair of diodes 15L and 15R, a pair of variable resistors 16L and 16R, a potentiometer 17 and an alarm control network 18.

Figure 2:
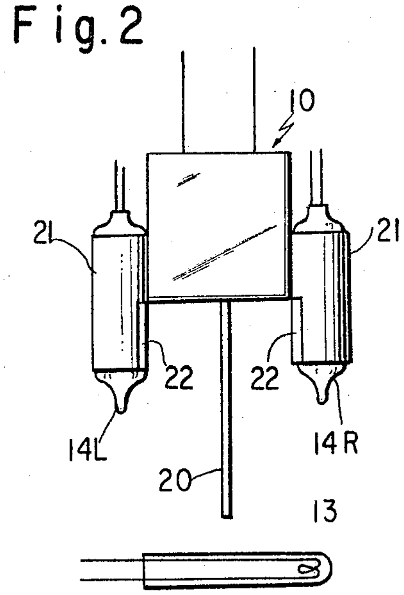
FIG. 2 is a top plan view illustrating the physical relationship of a photocell, two lamps isolated by a partition, and a lamp for compensating variations of ambient light intensity.
Figure 3:
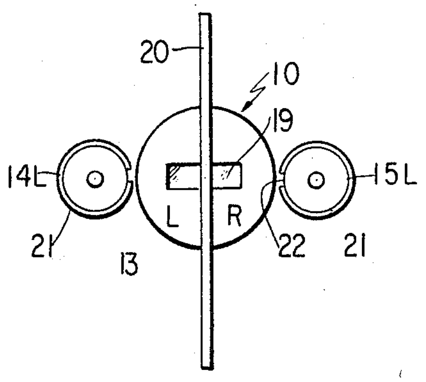
FIG. 3 is a front elevational view of the components shown in FIG. 2.

As shown in FIGS. 2 and 3, the cell 10 has a window 19 which is exposed to ambient light and is divided into left and right isolated surface portions L and R by an opaque partition 20 extending vertically outwardly of and across the window at the middle thereof. The lamp 13 extends horizontally across the partition below (or above) the window 19 so as to equally illuminate both of the window portions L and R. The lamps 14L and 14R are mounted diametrically opposite and adjacent the left and right sides of the cell, respectively; and have a shield 21 thereon formed with a window 22 for directing the light of the lamps 14L and 14R on the window portions L and R, respectively.

The cell 10 may be of the cadmium sulfide type which changes in resistance in response to changes in ambient light intensity. Alternately, other light or radiation sensitive cells or devices may be utilized.

The lamp 13 preferably is of the incandescent type but equivalent means for generating heat or magnetic radiations to which the element 10 responds may be utilized. The lamps 14L and 14R preferably are of the neon type but here again equivalent radiation generating means of the foregoing described type may be employed.

The potentiometer 17 includes a resistor 24 and an adjustable voltage dividing contact 25 which is connected to one terminal 26 of the A.C. source 12. The cell 10 and the capacitor 11 are connected in series across the terminals 26 and 27 of the A.C. source; and the lamp 13 is connected across the A.C. source in parallel with the cell 10.

If desired, a variable resistor 9 may be connected in series with the lamp 13 to adjust the brightness thereof or a transistorized network could be provided for controlling the brightness of the lamp to compensate for changes in ambient light which the element 10 sees. The alarm control network 18 is connected across the terminal of the capacitor 11.

The lamp 14L, the diode 15L and the variable resistor 16L are connected in series between one terminal 28 of the resistor 24 and the A.C. source terminal 27; and the lamp 14R, the diode 15R and the variable resistor 16R are connected in series between the other terminal 29 of the resistor 24 and the A.C. source terminal 27. The diodes are so arranged that one conducts on one-half cycle of A.C. and that the other conducts on the other half cycle of A.C. to alternately illuminate the lamps 14L and 14R.

The system is first adjusted by positioning the potentiometer contact 25 to balance the voltage across the lamps 14L and 14R, and the variable resistors 16L and 15R are positioned so that the lamps 14L and 14R are illuminated at an equal intensity. The optical system is adjusted to focus on the cell 10 the surface area to be supervised, and the variable resistor 9 is adjusted so that the lamp 13 is illuminated at an intensity to provide the desired additional ambient light to the cell.

When the ambient (light which the cell sees through the optical system) changes, the resistance of the cell changes and causes the voltage across the lamp 13 to change so that the brightness of this lamp changes in a proportion to maintain the total ambient light seen by the cell at a constant level.

In operation, when the diode 15L conducts, the lamp 14L is illuminated and light is directed onto the cell window portion L and for that half cycle current flows through the cell 10 from right to left to charge the capacitor 11 at the right side thereof. When diode 15R conducts, the lamp 14R is illuminated and light is directed onto the cell window portion R and for that half cycle current flows through the cell from left to right to charge the capacitor at the left side thereof.

When there is no intruder in the area viewed by the window of the cell, the cell window portions L and R are alternately exposed to light of equal intensity and the capacitor will be charged alternately equally at opposite sides thereof and has no output.

However, when there is an intruder in the area, a window portion on one side of the partition sees the image and the intensity of the ambient light viewed by that window portion changes when its lamp is illuminated, whereupon the capacitor is charged unequally at opposite sides thereof in sequence and the difference in charge produces an output capable of operating the alarm control network.

Figure 4:
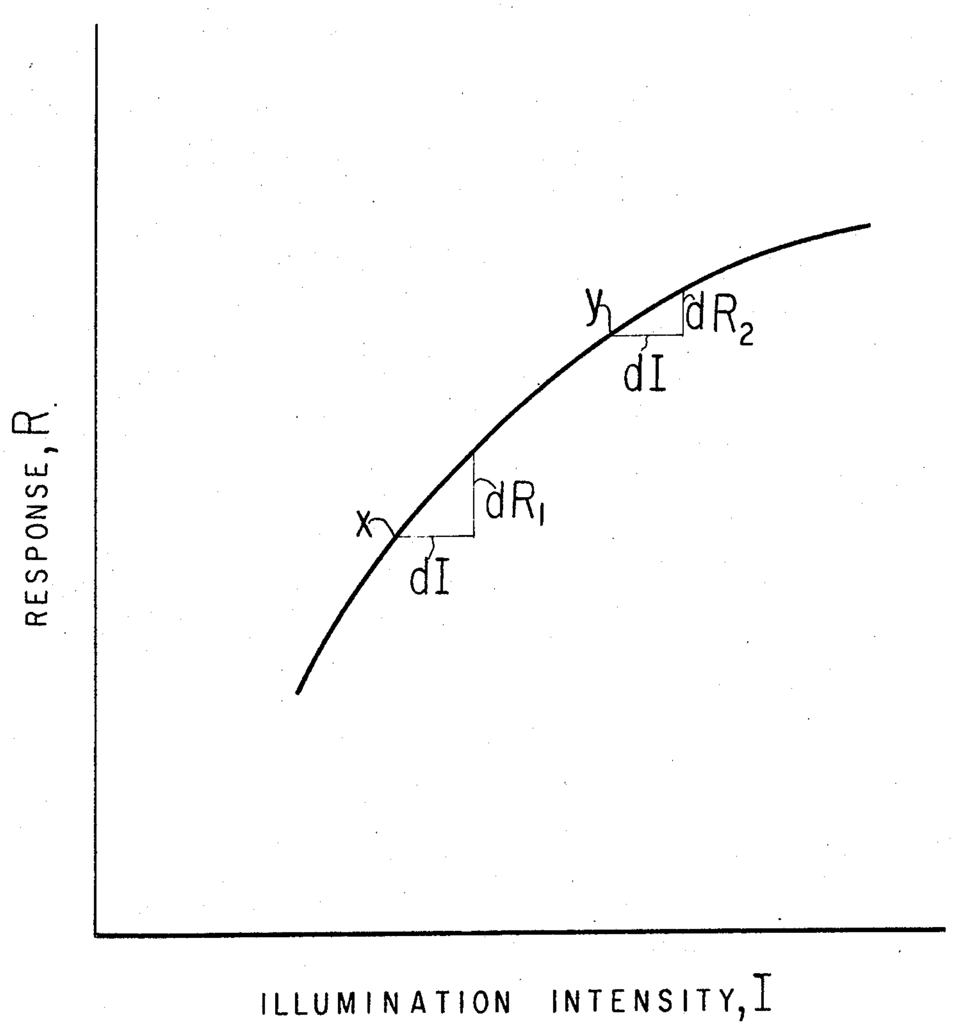
FIG. 4 is a graph illustrating a non-linear portion of the response curve of the photocell element in relation to illumination of the cell.

In FIG. 4, a non-linear portion of the response curve of the cell 10 is shown on an enlarged scale. By use of the lamp 13 and the arrangement for causing this lamp to maintain the total ambient light at a constant level, the cell can be adjusted so that, in the absence of an intruder, the response of the cell as the lamps 14L and 14R are alternately illuminated will be at the same point $x$ on a predetermined non-linear portion of the response curve. Thus, at the point $x$, $$\frac{d(\mathrm{R})_{\mathrm{L}}}{d\mathrm{I}_{\mathrm{L}}}=\frac{d(\mathrm{R})_{\mathrm{R}}}{d\mathrm{I}_{\mathrm{R}}}$$

whereby there is no change in response between successive half cycles of the cell and capacitor is charged equally at both sides thereof.

However, assuming that the window portion R sees an image due to an intruder, a different amount of light will fall on the cell during the half cycles of the cell and the intensity of the light will cause the cell to respond at a different point $y$ on the non-linear portion of the curve. Thus, at $(x)$ $$\frac{d(\mathrm{R})_{\mathrm{L}}}{d\mathrm{I}_{\mathrm{L}}}\neq(\text{at } y)\ \frac{d(\mathrm{R})_{\mathrm{R}}}{d\mathrm{I}_{\mathrm{R}}}$$

whereby, due to the change in response rate, the capacitor will be charged unequally at opposite sides in sequence to produce an alarm actuating signal.

While the present invention has been described with reference to a system devoid of moving parts such as disclosed in my application Serial No. 379,104 filed June 30, 1964, it is contemplated that the balanced compensating lamp arrangement could likewise be embodied in systems such as disclosed in my copending application Serial No. 378,129, filed June 26, 1964.

From the foregoing description, it will be seen that the present invention provides a further improved intruder detecting system.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. An intruder detection system comprising an electrical element responsive to light to change electrical values thereof and having a surface exposed to ambient light, a partition dividing said surface into two isolated portions, first and second lamps at the respective sides of said partition for exposing said surface portions to light from said lamps, a source of A.C. reactance means connected in series with said element across said A.C. source, a first diode connected in series with said first lamp across said A.C. source and arranged to conduct in one direction of current flow, a second diode connected in series with said second lamp across said A.C. source and arranged to conduct in the opposite direction of current flow whereby said lamps are alternately illuminated to alternately expose said surface portions to an equal higher and lower light intensity, a third lamp connected across said A.C. source in parallel with said element for constantly directing ambient light of a predetermined equal intensity on both of said surface portions to compensate for substantial changes in ambient light within the area to be protected against intrusion, said reactance means having an output upon being charged unequally at opposite sides in sequence due to the presence of an intruder, and means connected across said reactance means responsive to the output of said reactance means for rendering an alarm.

2. A system according to claim 1, including a potentiometer connected for balancing the voltage across said first and second lamps.

3. A system according to claim 1, including a variable resistor connected in series with said first and second lamps for adjusting the light intensity thereof.

4. An intruder detection system comprising an electrical element responsive to light to change electrical values thereof and having a surface exposed to ambient light, means for alternately exposing two portions of the surface of said element to an equal higher and lower light intensity, a light generating device connected in parallel with said element for directing light of equal intensity on both of said surface portions, reactance means connected in series with said element, a power source for producing current of reversing polarity through said element and said reactance means and for operating said alternately exposing means so that opposite sides of said reactance means are alternately charged to opposite polarities upon said alternate exposure of the two surface portions of said element, whereby said reactance means discharges to produce an output upon being charged unequally at opposite sides in sequence, and means responsive to the output of said reactance means for rendering an alarm.

5. An intruder detection system comprising an electrical element responsive to light and other radiations to change electrical values thereof and having a surface exposed to ambient light, a partition dividing said surface into two isolated portions, first and second radiation generating devices at the respective sides of said partition for exposing said surface portions to radiations from said device, a source of A.C. reactance means connected in series with said element across said A.C. source, a first diode connected in series with said first device across said A.C. source and arranged to conduct in one direction of current flow, a second diode connected in series with said second device across said A.C. source and arranged to conduct in the opposite direction of current flow whereby said devices are alternately energized to alternately expose said surface portions to an equal higher and lower radiation intensity, a third radiation generating device connected across said A.C. source in parallel with said element for constantly directing radiations of a predetermined equal intensity on both of said surface portions to compensate for substantial changes in ambient light within the area to be protected against intrusion, said reactance means having an output upon being charged unequally at opposite sides in sequence due to the presence of an intruder, and means connected across said reactance means responsive to the output of said reactance means for rendering an alarm.

No references cited.
NEIL C. READ, *Primary Examiner.*
R. GOLDMAN, *Assistant Examiner.*